(12) United States Patent
Richmond et al.

(10) Patent No.: US 7,589,926 B2
(45) Date of Patent: Sep. 15, 2009

(54) METHODS AND APPARATUS FOR FORMATTING MEMORY MEDIA

(75) Inventors: Scott Richmond, Boulder, CO (US); Michael James, Longmont, CO (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/023,393

(22) Filed: Jan. 31, 2008

(65) Prior Publication Data

US 2009/0195907 A1    Aug. 6, 2009

(51) Int. Cl.
*G11B 5/09*    (2006.01)
(52) U.S. Cl. ...................................... 360/48
(58) Field of Classification Search ........... 360/48, 360/69, 75, 51, 53; 714/8
See application file for complete search history.

(56) References Cited

U.S. PATENT DOCUMENTS

| | | | |
|---|---|---|---|
| 5,818,654 A * | 10/1998 | Reddy et al. | 360/53 |
| 5,963,386 A * | 10/1999 | Assouad | 360/48 |
| 6,034,831 A * | 3/2000 | Dobbek et al. | 360/53 |
| 6,078,452 A * | 6/2000 | Kittilson et al. | 360/51 |
| 6,185,058 B1 * | 2/2001 | Dobbek et al. | 360/48 |
| 6,223,303 B1 * | 4/2001 | Billings et al. | 714/8 |
| 6,295,176 B1 * | 9/2001 | Reddy et al. | 360/48 |
| 6,411,458 B1 * | 6/2002 | Billings et al. | 360/75 |
| 6,496,943 B1 * | 12/2002 | Belser et al. | 714/8 |
| 6,535,995 B1 * | 3/2003 | Dobbek | 714/8 |
| 6,950,265 B2 * | 9/2005 | Hetzler et al. | 360/75 |

* cited by examiner

*Primary Examiner*—Fred Tzeng
(74) *Attorney, Agent, or Firm*—Greer, Burns & Crain, Ltd

(57) ABSTRACT

At least one rotating memory medium such as a hard disk is installed in a hard disk drive or the like. The disk drive has a controller, controller memory and one or more heads for writing and reading to and from one or both sides of the disk. The disk is scanned for defects as sector locations, servo wedges and other information are recorded on tracks on the disk. Some unused space is reserved around the track to compensate for the area lost to defects. If a defect is detected in a sector, the sector is split into first and second parts on either side of the defective space. The location of the defective space is recorded in the controller memory and is processed like a servo wedge. In this manner, only part of the sector is lost due to the defect.

4 Claims, 5 Drawing Sheets

FIG. 3

| SECTOR 0 | SECTOR 1 | SECTOR 2 | SECTOR 3 | SECTOR 4 | SECTOR 5 | SECTOR 6 | SECTOR 7 | SECTOR 8 | SECTOR 9 | SPARE 0 |

FIG. 4

| SECTOR 0 | SECTOR 1 | SECTOR 2 | SECTOR 3 | SECTOR 4 | SECTOR 5 | DEFECT | SECTOR 6 | SECTOR 7 | SECTOR 8 | SECTOR 9 |

FIG. 5A

| SECTOR 0 | SECTOR 1 | SECTOR 2 | SECTOR 3 | SEC 4 | DFCT | SEC 4 | SECTOR 5 | SECTOR 6 | SEC 7 | DFCT | SEC 7 | SECTOR 8 | SECTOR 9 | UNAS-SIGNED |

METHODS AND APPARATUS FOR FORMATTING MEMORY MEDIA

This invention relates to methods and apparatus for formatting memory media, and more particularly, to methods and apparatus for isolating defects in the memory media for data recording/reproducing purposes, without isolating the entire sector in which a defect is found.

BACKGROUND OF THE INVENTION

In conventional hard disk drives and the like, a rotating memory media is divided into circumferential tracks. Data is written to and read from the tracks by read and write heads. The location of the heads is controlled using servo information which is written on the disk at the time of manufacture, through a formatting process.

Servo information typically includes several wedges that extend radially from the center of the disk, across all of the tracks. The servo wedges are only used for tracking purposes, not data recording purposes.

For recording purposes, the tracks are divided into sectors. Today's sectors each typically store 512 bytes of user data. For processing purposes, the bytes are often grouped into 10-bit symbols. The symbol length is determined by the encoding method used by the read/write channel, and error correction code ECC.

The lineal length of all of the sectors is substantially equal, but the lineal distance between servo wedges changes constantly, because the wedges extend radially from the center of the media. As a result, a portion of a sector or a number of sectors can be recorded between adjacent servo wedges. In fact, a sector can be divided into two parts, one on either side of a servo wedge.

This conventional arrangement records data on the tracks in a fairly efficient manner, but if even a small defect is detected in a sector in the servo writing or other formatting process, the entire sector is not used. This is an inefficient use of disk space. Accordingly, there is a need for methods and apparatus for more efficiently isolating defects in memory media when the media is formatted, without isolating an entire sector in which a defect is found.

SUMMARY OF THE INVENTION

In keeping with one aspect of this invention, at least one rotating memory medium such as a hard disk is installed in a hard disk drive or the like. The disk drive has a controller, controller memory and one or two heads for writing and reading to and from one or both sides of the disk. The disk is scanned for defects as sector locations, servo wedges and other information are recorded on tracks on the disk. Some unused space is reserved around the track to compensate for the area lost to defects. If a defect is detected in a sector, the sector is split into first and second parts on either side of the defective space. The location of the defective space is recorded in the controller memory and is processed like a servo wedge. In this manner, only part of the sector is lost due to the defect.

The location of the read/write heads and the recording/reproducing process are supervised by the controller. Today's controllers anticipate servo wedges by counting sectors and symbols between servo wedges. The number of symbols between servo wedges is pre-recorded in the controller memory.

When a defect is discovered in the disk during the formatting process, its position is recorded as the number of symbols between the previous servo wedge and the beginning of the defect. In one embodiment, the width of a defect is recorded in the controller memory as defective space. The controller stops data from being recorded in the defective space, and does not expect to read data from the defective space in operation.

The controller counts the symbols from the end of the servo wedge preceding the unused space and reads/writes data until the number of symbols reaches a predetermined number known to mark the beginning of the next servo wedge or defective space. When the head reaches the end of the servo wedge or defective space, the head starts reading/write operations again, and the controller counts another predetermined number of symbols, to the beginning of the next servo wedge or defective space.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 3 is an example of a conventional track format of the prior art where an entire sector of area is reserved for defects.

FIG. 4 is an example of a conventional track format where sectors around and after the defect are slipped or skipped.

FIG. 5A is a diagram showing sectors having defects.

DETAILED DESCRIPTION

Figure 1:
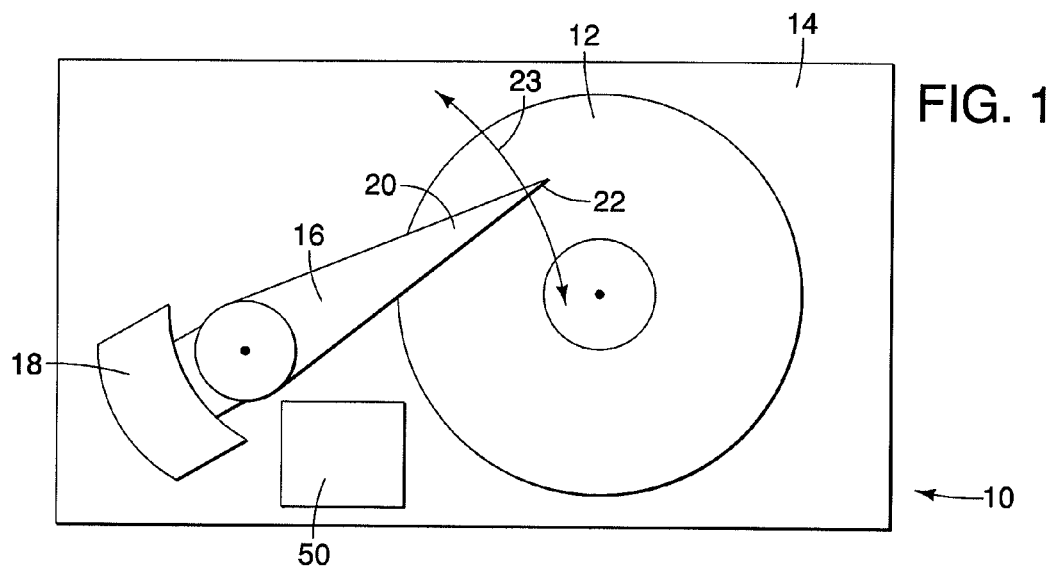
FIG. 1 is a diagram of a memory medium in a disk drive made in accordance with the present invention.

Referring to FIG. 1, a hard disk drive 10 includes at least one disk medium 12, in a case 14. Also enclosed in the case 14 are an actuator 16 driven by a voice coil motor 18, a suspension 20 secured to the actuator 16, and a slider 22. The slider 22 has a write head and a read head (not shown in FIG. 1). In operation, the recording medium 12 is rotated, and the slider 22 is positioned over the disk radially as the write head writes data to the rotating disk and the read head reads data from the rotating disk. The slider 22 is moved across the disk radially in the directions of an arrow 23 for seeking or changing tracks.

Figure 2:
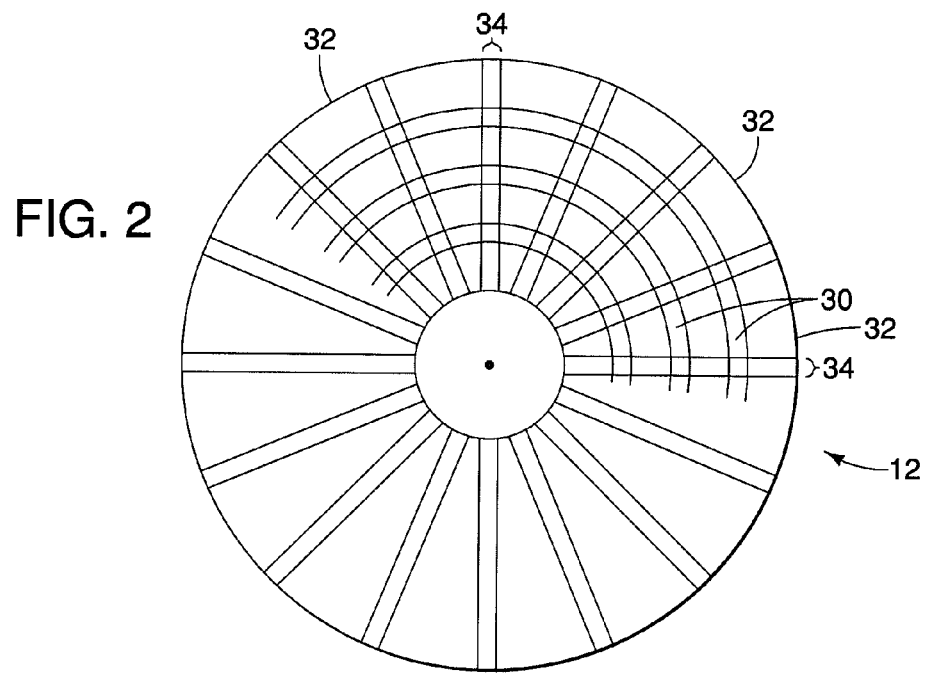
FIG. 2 is a diagram of the memory medium of FIG. 1.

Data is recorded on circumferential tracks 30, shown in FIG. 2. Each track 30 is divided in to data wedges 32 and servo wedges 34. Servo information recorded in the servo wedges 34 is used to control the location of the heads over the tracks. As seen in FIG. 2, the data wedges 32 and servo wedges 34 extend radially from the center of the disk. The linear circumferential lengths of the data and servo wedges are relatively short near the center of the medium 12, and become progressively longer on the outer radial tracks.

User data is recorded on the tracks in generally equal sectors, as seen in FIG. 3. The user data typically includes all synchronization, training, error correction codes (ECC), and all speed tolerances or other information needed to store data reliably. Generally, a sector is the area between start of sector (SOS) pulses. Each sector has enough space or area to record a predetermined number of data symbols. The area is defined by a number of clock pulses or clocks corresponding to the number of symbols. It is not unusual to divide a track into 10 data sectors (sector 0-9), and reserve an eleventh sector (spare 0) in the event that defects are found in one of the sectors. In a conventional drive, defective sectors are not used, as seen in FIG. 4. In FIG. 4, the sector 6 in FIG. 3 has a defect, so sector 7 in FIG. 3 is designated sector 6 in FIG. 4, the remaining sectors are renumbered, and spare sector 0 in FIG. 3 is used as sector 9 in FIG. 4.

Because the sector length is constant and the data cylinders 32 are not constant, it is not unusual for a sector to be divided across a servo wedge 34. User data is not written to or read from the servo wedges 34, so the recording must stop at the beginning of a servo wedge, and resume after the head passes the servo wedge. This is accomplished by a controller 50 (FIG. 1), shown in detail in FIG. 6.

Generally, the controller 50 includes a microprocessor or the like 52 that is programmed to perform the functions that will now be described. The MPU has an input/output port 54 for receiving and sending data to a host device such as a computer 56, volatile cache memory 58 for storing data and other information, a DRAM 60 for operating the MPU 52 and storing user data, and the same or another DRAM 62 used for controlling read and write operations of the head.

Figure 6:
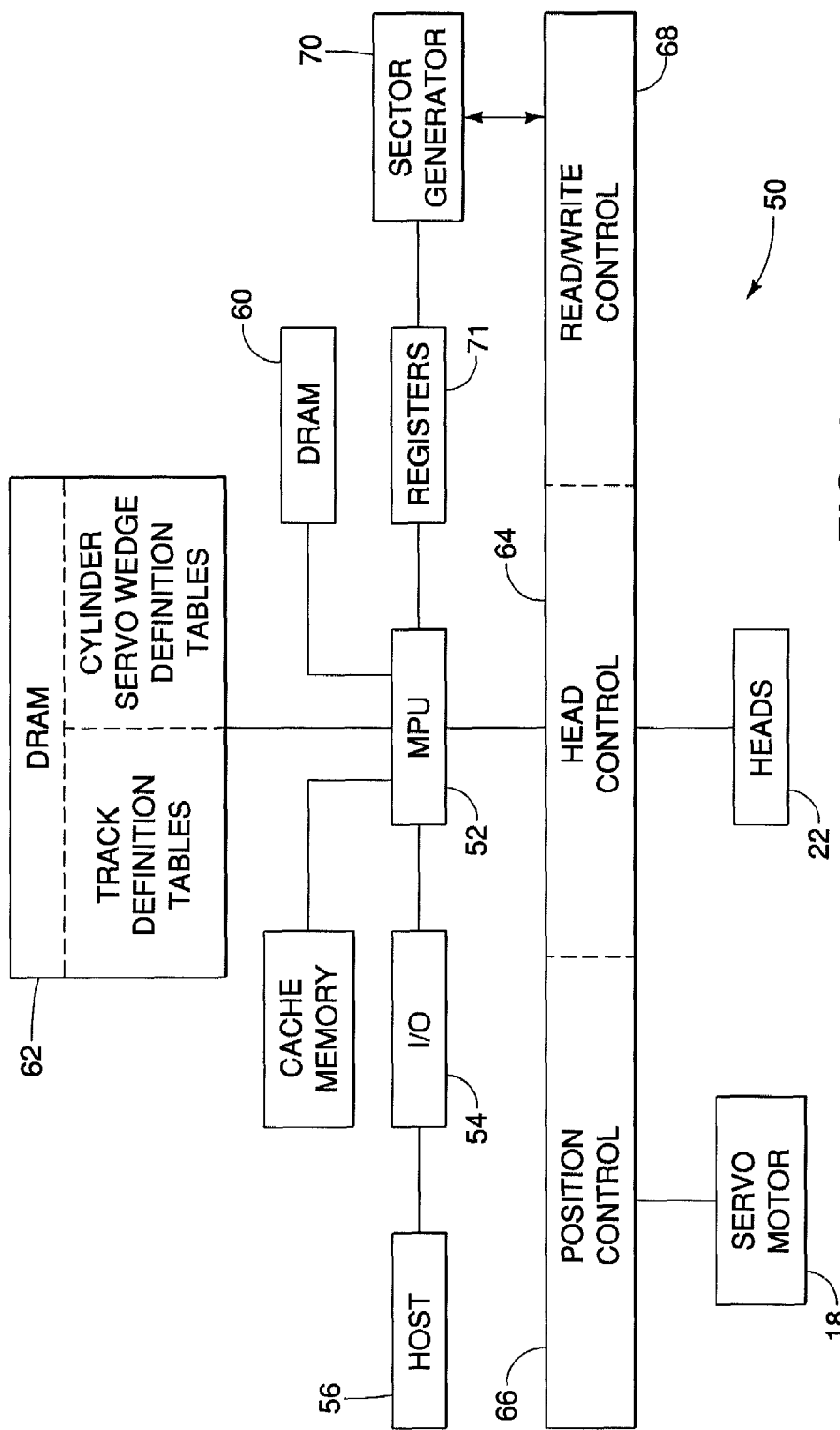
FIG. 6 is a block diagram of the disk data path portions of a disk controller using the present invention.

Some of the algorithms used by the MPU 52 are indicated generally in FIG. 6 at 64. The head control algorithms 64 include algorithms 66 for controlling the position of the actuator 16 through the servo motor 18, and other algorithms 68 that are used to essentially turn the read and write heads on and off. Among other things, the read/write control algorithms 68 include sector generator algorithms 70, which use prerecorded data in the DRAM 62 to produce up-date registers 71 used to control the read and write heads. In practice, many of the functions of these algorithms are performed by hardware. The algorithms can be performed by the MPU, which then programs the different hardware blocks as the algorithms require.

Figure 7:
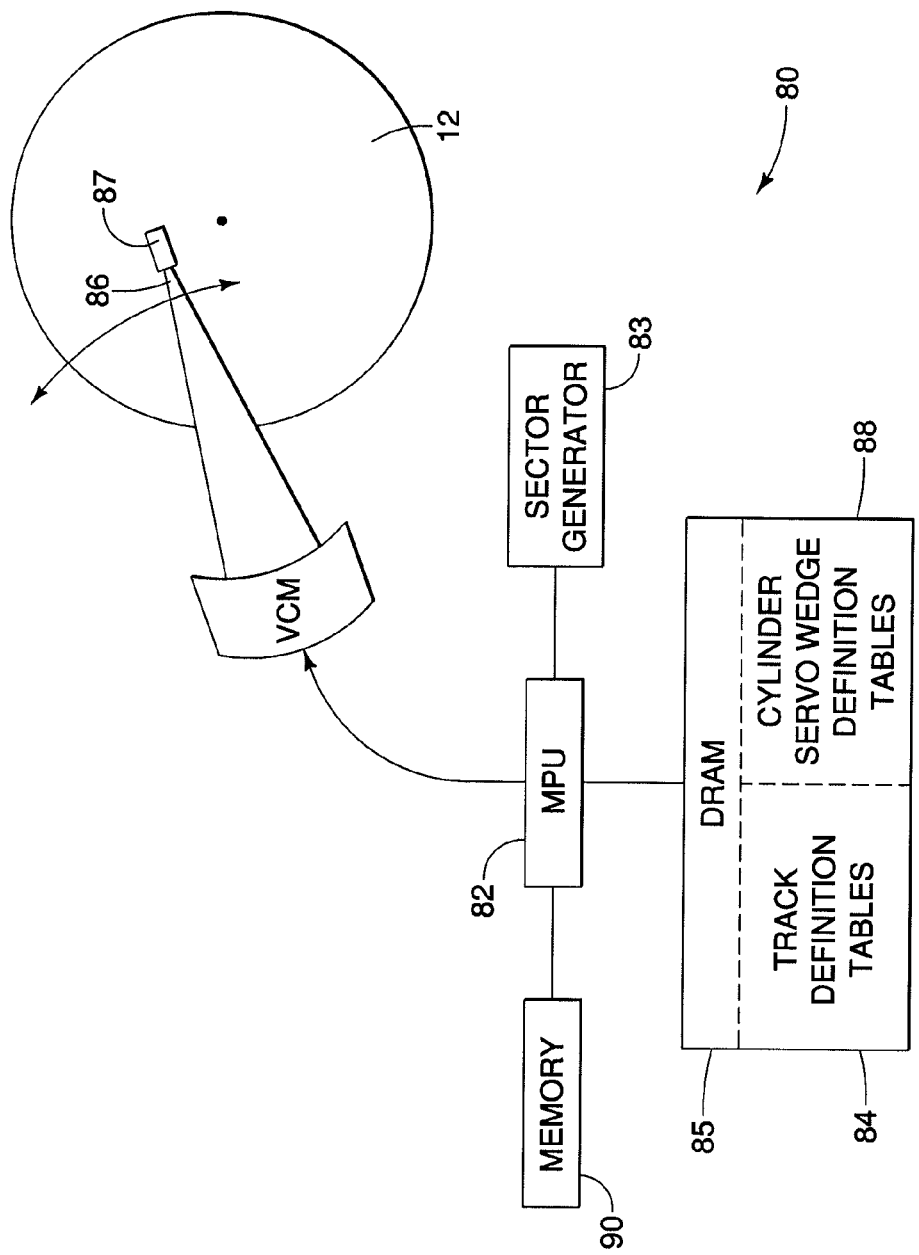
FIG. 7 is a block diagram of a servo writer for the present invention.

The data stored in the DRAM 62 is generated when the medium 12 is formatted by a disk formatter 80, shown in FIG. 7. The disk formatter 80 includes a controller 82 programmed with sector generator algorithms 83 for defining the concentric tracks on the medium 12 using a write head 86, and a read head 87 and generating and storing track definition tables 84 in a DRAM 85, and other algorithms for defining data sectors and servo wedges and generating and storing cylinder and servo wedge definition tables 88 in the DRAM 85, and recording servo information in the servo wedges on the medium 12. Controller 50 also scans the tracks of the medium 12 for defects and stores a location of each defect in a memory 90. The data in the memory 90 and DRAM 85 is transferred to the disk drive media of FIG. 1, if needed.

An example of a split sector with defects is seen in FIG. 5A.

Sector 4 has a defect, so it is split across the defect, using a portion of the spare sector 0 in FIG. 3. Sector 7 also has a defect, and is split across the defect using more of the space allocated to spare sector 0 in FIG. 3, leaving the remainder of spare sector 0 unassigned. If there were additional defects, and there were no unassigned space from the spare sector 0, sector 9 would be recorded in the next zone or cylinder.

Figure 5B:
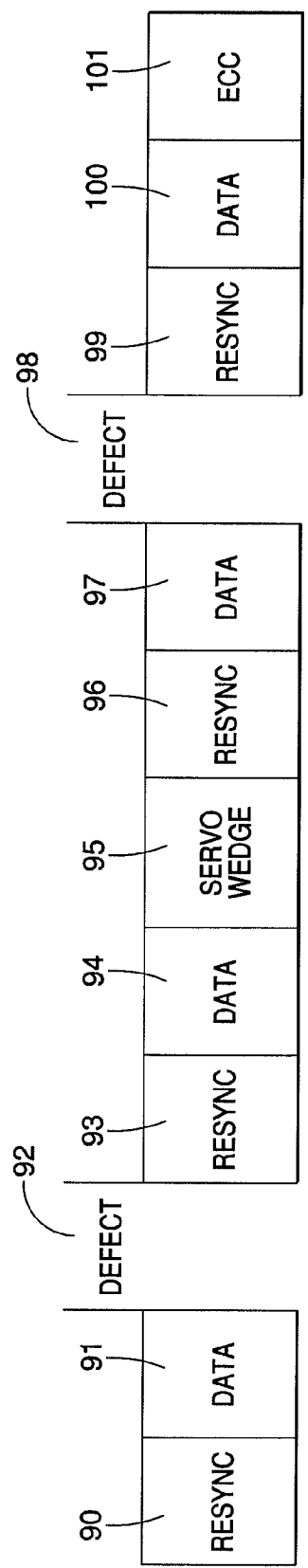
FIG. 5B is a diagram showing skipped defects.

The manner in which the defects are skipped is shown in greater detail in FIG. 5B. After resynchronizing the head in a track space 90, data is recorded in space 91. Data is not recorded in defect space 92, so a second resynchronization space 93 is provided, and data is recorded in the space 94, until a servo wedge 95 is reached. After the servo wedge 95, the head passes a resynchronizing zone 96, followed by another data zone 97. After defect 98, another resynchronizing space 99 is provided followed by data space 100 and an error correction code (ECC) space 101. In this manner, the defect spaces are treated like servo wedges, and the entire sector is not lost.

Various algorithms are used to perform these functions. They will be described using terms and registers which will now be defined and described.

The locations of servo wedges are defined by the controller 82 by counting pulses from a first predetermined point to a second predetermined point, identifying the beginning and the end of each servo wedge. The controller 82 also counts or records pulses from the end of each servo wedge, which marks the beginning of a data sector, to the end of the data sector, which marks the starting location of the next succeeding servo wedge. The servo count pulses are recorded on the disk.

The sector generator 70 uses several registers to establish various disk parameters. One parameter is "start of sector (SOS)" which identifies locations on the disk where the disk formatter begins to write or read a sector. The SOS locations are based upon the "servo count" and "wedge count". The "servo count" is calculated by a counter running at a rate determined by servo information used to determine the circumferential position of the head on the disk. The number of servo wedges from zero, or "index", used in conjunction with the servo count to determine the circumferential position on the disk, is referred to as the "wedge count". A "symbol count" is determined by a counter running at the single rate used by the disk formatter to read or write data.

The disk formatter also defines "intersector gaps (ISG)". An ISG is the area on the disk between sectors.

The formatter defines the "recording zone" on the disk, which is a number of tracks/cylinders all using the same track format and symbol rates.

The disk formatter identifies "defect locations" by marking the location of the start of a defective area in the "wedge count" and "servo counts". The "defect length", or length of the defect in servo counts, is also identified. A "defect table" is formed which can be read from DRAM 85, and contains defect information for a current "defect zone". The "symbol defect length" is the length of the defect in symbol clocks.

A "Split count" parameter is the value used by the disk formatter in symbol counts to begin the split of a sector around either a servo wedge or a defect. A "Min Split" parameter is the smallest area that a sector may be started before having to split around a "servo wedge". The "Min Split" causes the end of a frame.

A "ratio parameter" is the ratio between "servo count" and "symbol count". This value will change in every recording zone. A "Frame" is a repetitive area of the track layout. This is an area where the SOS for the first sector of the frame is immediately after the servo wedge, and the last sector ends closer to a servo wedge than the "Min Split" length.

A "frame table" is a table from DDR that represents the SOS and split information for a frame.

A "Go_Indication" parameter is an indication from the formatter that the sector generator should perform a set of calculations.

"Type" is an input used by Split_Count to determine a defect DFCT or split, and "where" is an input used by Split_Count to determine if DFCT is pre- or post-survey wedge split.

The sector generator uses these parameters and several registers to control read/write operations.

The following registers are used on a per recording zone basis:

SYMBOLS_PER_SECTOR—Symbols per Sector. This register stores the total number of symbols per sector, including ECC, sync fields, and ISG area.

SVOCLKS_PER_SECTOR—This register stores the total number of servo clocks per sector, including ECC, sync fields, and ISG area.

SYMBOLS_PER_WEDGE—This register stores the number of symbol clocks per servo Wedge. This value will change from recording zone to recording zone.

SVOCLKS_PER_WEDGE—This register stores the number of servo clocks per Wedge

RATIO—This register stores the number of Servo Clocks per Symbol Clock for the current recording zone.

SECTORS_PER_TRACK—This register stores the number of physical sectors per track. It is used to rollover SECTOR_NUMBER, which will be described later.

SVO_CNT_AT_START_OF_DATA—This register stores the Servo Count at the first place where an SOS may occur.

SYMBOLS_PER_RESYNC—This register stores the size of all fields required for resynchronization after a split in Symbol Clocks.

SVO_CLKS_PER_RESYNC—This register stores the number the size of all fields required for resynchronization after a split in Servo Clocks.

MIN_SPLIT—This register stores the minimum number of servo clocks required from SOS to a Servo Wedge to allow starting another sector (end of frame).

The following register is used on a per command basis:

SECTOR_NUMBER—This register stores the physical sector number for which the SOS is being calculated.

The following registers are used for local variable storage and calculation results.

SOS_WEDGE_NUM—This register stores the SOS Wedge number for next sector.

SOS_SVO_CNT—This register stores the SOS Servo Count value for the next sector.

CURR_SOS_SVO_CNT—This register is used to determine if a defect or Servo Wedge needs to be split around for the current Sector. This saved version of SOS_SVO_CNT=current CURR_SOS_WEDGE_NUM—This register is used in conjunction with CURR_SOS_SVO_CNT.

DFCT_TBL_PTR—and points to the next defect to be evaluated for SOS and Split Count calculations.

SPLIT_COUNT—This register, the Split Count is adjusted for defects. This register is a first in, first out, or fifo register, and multiple entries per sector are accommodated.

RESUME_COUNT—This register stores the location to the start Resync Field. This register is a fifo, and multiple entries per sector are accommodated.

SPLIT_COUNT_SYMBOL—This register stores the Split Count in symbol clock values. This register is a temporary variable.

DFCT_ACCUMULATOR—This register accumulates defect lengths from the start to end of a track, and is used to aid split calculations CURR_SECTOR_NUMBER—This register stores the Sector number that the heads are currently passing over.

SPLIT_NEEDED—This register is used to be sure that splits across a servo wedge are calculated after all defects that precede the servo wedge. A split data field across a servo wedge is necessary for this sector.

The sector generator retrieves, or uses a defect table stored in DRAM for each Defect Zone containing the locations of defects (Defect_Location_Wedge), the starting point of each defect as measured by servo clock signals from the start of the defective area (Defect_Location_Servo_Clocks), and the length of the defect, also measured in servo clocks (Defect_Length_Servo_Clocks).

Start Of Sector calculations are performed when the controller begins to calculate information in search of a target sector. The SOS for the next sector is calculated, while the Split Counts for the current sector are calculated. This is performed once per sector after that. Once the current information has been used by the formatter, an indication is sent to the sector generator, and the next iteration of the "for" loop for i from CURR_SECTOR_NUMBER to SECTOR_NUMBER on the next page is performed.

The following pseudo code is instructive in understanding this process. The pseudo code is similar to C programming, and can be performed by either a state machine or a microprocessor.

Pseudo-code definitions:

//=comments

{ }=start and end of a complex statement.

;=end of a statement

&&=logical and

||=logical or ( )=evaluate this term prior to other terms in an equation

+=increment

−=decrement

>==greater than or equal

<==less than or equal

!==not equal

%=modulo

==assignment

===equality

[ ]=index into a table or array

Start of Sector Calculator Pseudo-Code

This pseudo-code is executed when the formatter starts to calculate information for the target sector. The SOS for the next sector is calculated, while the split counts for the current sectors are calculated. The pseudo-code is performed once per sector after that. Once the current information has been used by the formatter, an indication is sent to the sector generator, and the next iteration of the loop is performed.

DFCT_TBL_PTR = 0; DFCT_ACCUMULATOR = 0;

CURR_SECTOR_NUMBER = ffh; Initial value of FFh allows the first increment to make this 0, as explained in comments below also.

SOS_WEDGE_NUM=0; SOS_SVO_CNT = SVO_CNT_AT_START_OF_DATA;

CURR_SOS_WEDGE_NUM = SOS_WEDGE_NUM; CURR_SOS_SVO_CNT = SOS_SVO_CNT; DFCT_ACCUMULATOR = 0;

// Calculate SOS from beginning of track (sector 0) to requested SECTOR_NUMBER

// once the calculations from CURR_SECTOR_NUMBER to SECTOR_NUMBER occurs, possibly // causing multiple loops through the loop, the calculation will be performed once per sector only.

```
for i from CURR_SECTOR_NUMBER to SECTOR_NUM-
BER {
    // wait here for indication from formatter that it is time to
begin a new sector's calculation
        while (go_indication != TRUE) { };
    // Initialization
    // values calculated the previous time through the loop are
now valid as current
    // first time through, CURR_SECTOR_NUMBER = ff,
Initial value of FFh allows the first increment to make this 0 so
this increment makes it 0.
        CURR_SECTOR_NUMBER += 1;
        CURR_SOS_WEDGE_NUM = SOS_WEDGE_NUM;
        CURR_SOS_SVO_CNT = SOS_SVO_CNT;
        SPLIT_NEEDED = 0;
    // increment SECTOR_NUMBER % SECTORS_PER_
TRACK once the original requested sector
    // has been reached. Otherwise hold SECTOR_NUMBER
as is.
        if   CURR_SECTOR_NUMBER   ==   SECTOR_
NUMBER {
            SECTOR_NUMBER += 1;};
        // Rollover needed?
        if SECTOR_NUMBER >= SECTORS_PER_TRACK
{SECTOR_NUMBER = 0};
    The following calculation is used to generate the informa-
tion necessary to locate the beginning of the Resync area 90
(FIG. 5B) for each sector. There are adjustments to this based
on defect information and servo wedge.
        // Start of Calculations
        // Add a Sector's worth of Servo Clocks
        SOS_SVO_CNT += SVOCLKS_PER_SECTOR;
    // if SOS_SVO_CNT > SVOCLKS_PER_WEDGE, incre-
ment
SOS_WEDGE_NUM and adjust
    // SOS_SVO_CNT
    // checks if a split occurs, and adjusts SOS_SVO_CNT, and
SOS_WEDGE_NUM accordingly
        // checks for MIN_SPLIT also
        call check_split_needed( );
        // Now see if adjustments for defects are needed?
    // if the next entry in the defect table is between the Current
SOS and SOS, or the end of the data wedge for a sector
    // split around a servo wedge, then adjust for that defect
    // while loop in order to process multiple defects or splits
per sector. First loop calculates to end of
    // sector, or the end of data wedge.
    The next loop is used after a split across a servo wedge.
This calculation determines if a defect 92 in FIG. 5B is
located for the current sector.
        while (Defect_Table[DFCT_TBL_PTR] [Defect_Loca-
tion_Wedge] == CURR_SOS_WEDGE_NUM &&
            Defect Table[DFCT_TBL_PTR] [Defect_Location_Ser-
                vo_Clocks] >= CURR_SOS_SVO_CNT &&
            Defect_Table[DFCT_TBL_PTR] [Defect_Location_Ser-
                vo_Clocks]<=   (SOS_SVO_CNT   ||   SVOCLKS_
                PER_WEDGE)) {
            // slip current SOS_SVO_CNT by Defect Length
            SOS_SVO_CNT += Defect_Table[DFCT_TBL_PTR]
                [Defect_Length_Servo_Clocks];
            // checks if a split occurs, and adjusts SOS_SVO_CNT,
                and
SOS_WEDGE_NUM
            // accordingly, checks for MIN_SPLIT also
            call check_split_needed( );
            if SPLIT_NEEDED ==1 {call split_count_calc(dfct,pre);
This returns results used to determine actual values for the
defects 92 and the resync fields 93 in FIG. 5B.
            // after the defect, see if a split sector is now necessary?
            call check_split_needed( );};
            DFCT_TBL_PTR ++;   // increment pointer each time
through while loop
        };  // end of while
    // all defects up to servo wedge or end of sector have been
processed, normal split around servo
        // wedge needed?
    // may not have been needed before defect processing, so
also check to see if a split across a servo
        // wedge will now happen?
        if SPLIT_NEEDED || ((SOS_SVO_CNT > SVOCLK-
S_PER_WEDGE) &
(SOS_SVO_CNT >= MIN_SPLIT)) {
            call split_count_calc(split,pre); This returns results used to
determine values for the servo wedge 95 and resync field 96 in
FIG. 5B.
            SPLIT_NEEDED = 0;};
        // if the sector has been split across a servo wedge, then
determine if there are any defects between
        // the beginning of the data wedge and the end of the current
sector
        // was the sector split?
        if   CURR_SOS_WEDGE_NUM   !=SOS_WEDGE_
NUM {
            while (Defect_Table[DFCT_TBL_PTR] [Defect_Loca-
                tion_Wedge] ==
SOS_WEDGE_NUM && Defect Table[DFCT_TBL_PTR]
[Defect_Location_Servo_Clocks] <=SOS_SVO_CNT) {
            // slip current SOS_SVO_CNT by Defect Length
                SOS_SVO_CNT += Defect_Table[DFCT_TBL_PTR]
[Defect_Length_Servo_Clocks];
                call check_split_needed( );
                if SPLIT_NEEDED == 1 {call split count calc(dfct,pre); //
This returns results used to determine actual values for the
defect 98 and resync field 99 in FIG. 5B.
                // increment pointer, look for next defect
                DFCT_TBL_PTR ++   // increment pointer each time
through while loop
            };  // end of while
        };  // end of if
};  // end of big for loop
    Split counts can be calculated along the lines of the follow-
ing pseudo code:

split_count_calc( );

// Entered with a valid DFCT_TBL_PTR, CURR_SOS_S-
VO_CNT, and

SOS_SVO_CNT

// also an input of dfct or split to determine if the defect table
info is used, or normal split // across a servo wedge information input type; // dfct or split // need to know if the defect is pre or post a servo wedge split input where; // pre or post // it has already been determined that a split is going to
happen, so no bounds checking is needed
```

```
if type == dfct {
    // Number of Servo Clocks from CURR_SOS_SVO_CNT
    to start of defect
    if where == pre {SPLIT_COUNT = Defect_Table
    [DFCT_TBL_PTR]
    [Defect_Location_Servo_Clocks] + CURR_SOS_S-
        VO_CNT+
    DFCT_ACCUMULATOR;
    };
    else { // where = post
    SPLIT_COUNT = Defect_Table[DFCT_TBL_PTR]
[Defect_Location Servo Clocks]-
    SVO_CNT_AT_START_OF_DATA + DFCT_ACCU-
    MULATOR; };
// type == split
else {
    // Number of Servo Clocks from CURR_SOS_SVO_CNT
    to end of data wedge
    SPLIT_COUNT = SVOCLKS_PER_WEDGE_CURR −
    SOS_SVO_CNT;
    SPLIT_COUNT_SYMBOL_SAVE = SPLIT_
    COUNT_SYMBOL; };
// convert from servo clocks to symbols
SPLIT_COUNT SYMBOL = SPLIT COUNT * RATIO;
// Adjust SPLIT_COUNT to get true Symbol Count value for
the SPLIT_COUNT
SPLIT_COUNT_SYMBOL −= SYMBOLS_PER_R-
    ESYNC;
if (split && post == TRUE) { SPLIT_COUNT_SYMBOL +=
    SPLIT_COUNT_SYMBOL_SAVE;
// don't add to DFCT_ACCUMULATOR if this is split
around servo wedge
if type == dfct {
    DFCT_ACCUMULATOR += Defect_Table[DFCT_T-
    BL_PTR]
[Defect_Length_Servo_Clocks]; };
// now calculate RESUME_COUNT
if type == dfct {
    RESUME_COUNT=SPLIT_COUNT +
    Defect_Length_Servo_Clocks; };
else {
    RESUME_COUNT = SVO_CNT_AT_START_OF_
    DATA; };
// done, return to caller
return;
```

The following calculation used to determine if a split around a servo wedge is needed. This is FIG. 5B (94, 95). The data field 94 encounters the servo wedge before the end of the sector, so the split is necessary, thus this calculation is necessary.

```
check split needed( );
    // this subroutine assumes all variables referenced are valid
    when called
    if SOS_SVO_CNT > SVOCLKS_PER_WEDGE {
    SPLIT_NEEDED = 1;
    // split sector across servo wedge, check for end of frame,
        and if not, add
    // SVO_CLKS_PER_RESYNC to SOS_SVO_CNT
    if (SVOCLKS_PER_WEDGE − SOS_SVO_CNT) >=
        MIN_SPLIT {
    SOS_SVO_CNT += SVO_CLKS_PER_RESYNC;
    // subtract SVOCLKS_PER_WEDGE to get raw value
        for far side of wedge
    // and add SVO_CNT_AT_START_OF_DATA to get
        true SOS for next sector
    SOS_SVO_CNT = SOS_SVO_CNT − SVOCLKS_PER_
    WEDGE+
    SVO_CNT_AT_START_OF_DATA;
    // must increment wedge number since we split across a
        wedge, and new SOS is in next wedge.
    // mod WEDGES_PER TRACK is for rollover to wedge
        number 0.
    (SOS_WEDGE_NUM += 1) % WEDGES_PER_
        TRACK; };
    // else (SVOCLKS_PER_WEDGE − SOS_SVO_CNT) <
    MIN_SPLIT
    // and it is a frame boundary, waste space and start over after
    Servo Wedge
    else {SOS_SVO_CNT = SVO_CNT_AT_START_OF_
    DATA;
    (SOS_WEDGE_NUM += 1) % WEDGES_PER_
        TRACK;
    SPLIT_NEEDED = 0; };
// else no split, SOS and wedge number are correct after raw
    addition above
else {SPLIT_NEEDED = 0};
return( );
```

The pseudo code for performing the functions needed to develop the fields in FIGS. 5A and 5B could be executed generally as follows:

SVOCLKS_PER_SECTOR = 0x681;

SYMBOLS_PER_SECTOR = 0x1042, 0x1000 = data; 0x2e = ECC; Resync Field =0x14

RATIO is 2.5 symbols per servo clock;

CURR_SOS_WEDGE_NUM = 5;

CURR_SOS_SVO_CNT = 0x447f;

MIN_SPLIT = 0x40;

SVO_CNT AT START_OF_DATA =0x80;

SVO_CLKS_PER_RESYNC = 0x13;

SYMBOLS_PER_RESYNC = 0x30;

SVOCLKS_PER_WEDGE = 0x4800;

Defect in first wedge

Defect_Location_Wedge = 5; Defect_Location_Servo_Clocks = 0x4600;

Defect_Length_Servo_Clocks = 0x30;

Defect in second wedge

Defect_Location_Wedge = 6; Defect_Location_Servo_Clocks =0x210;

Defect_Length_Servo_Clocks =0x28;
    CURR_SECTOR_NUMBER = 4;
    SECTOR_NUMBER = 5;

SPLIT_COUNT_SYMBOL_SAVE = 0;

Start of Calculations

This section lists the calculations from the pseudo-code above, and shows the results. Subroutine calls are shown with the results of calculations performed in the subroutines. This section is used to generate the Resync field 90 in FIG. 5B (90).

CURR_SECTOR_NUMBER = SOS_SVO_CNT = 5;
    CURR_SOS_WEDGE_NUM = SOS_WEDGE_NUM = 5;
    CURR_SOS_SVO_CNT = SOS_SVO_CNT = 0x447f,
call check_split_needed( );
    SOS_SVO_CNT = 0x447f + 0x681 = 0x4b00;
    SPLIT_NEEDED = 1;
    SOS_WEDGE_NUM += 1 = 6;
    return;
    SOS_SVO_CNT += SVO_CLKS_PER_RESYNC = 0x4b13;
    SOS_SVO_CNT = SOS_SVO_CNT - SVOCLKS_PER_WEDGE +
        SVO_CNT_AT_START_OF_DATA = 0x4b13 -0x4800 +0x80 = 0x393;
    // Now see if adjustments for defects are needed?
    // if next entry in defect table is between Current SOS and SOS, or end of data wedge, then adjust for
    // that defect (This calculates the defect 92 and the Resync field 93 in FIG. 5B)
    while (Defect_Location_Wedge == CURR_SOS_WEDGE_NUM = 5, 5 = TRUE &&
        Defect_Location_Servo_Clocks >= CURR_SOS_SVO_CNT =0x4600 > 0x447f &&
        Defect_Location_Servo_Clocks <= (SOS_SVO_CNT || SVOCLKS_PER_WEDGE)) <0x4800;
        SOS_SVO_CNT += Defect_Length_Servo_Clocks = 0x393 + 0x 30 =0x3c3;
    call check_split_needed( );
    SPLIT_NEEDED == 1
    call split_count_calc(dfct,pre);
    SPLIT_COUNT = Defect_Location_Servo_Clocks - CURR_SOS_SVO_CNT +
        DFCT_ACCUMULATOR; =0x4600 -0x447f + 0 = 0x181;
    SPLIT_COUNT_SYMBOL = SPLIT_COUNT * RATIO =0x3c2;
    SPLIT_COUNT_SYMBOL -=SYMBOLS_PER_RESYNC = 0x3c2 -0x30 = 0x392;
    DFCT_ACCUMULATOR += Defect_Length_Servo_Clocks =0x30;
    RESUME_COUNT = SPLIT_COUNT + Defect_Length_Servo_Clocks = 0x181+0x28= 0x1a9;
    return;
    call check_split_needed( );
    SPLIT_NEEDED == 1
        DFCT_TBL_PTR ++ ; // increment pointer each time through while loop
    }; // end of while
    // all defects up to servo wedge or end of sector have been processed, normal split around servo
    // wedge needed? (This calculates values for 95 and 96)
    if SPLIT_NEEDED || ((SOS_SVO_CNT > SVOCLKS_PER_WEDGE) & (SOS_SVO_CNT >= MIN_SPLIT)) = SPLIT_NEEDED = TRUE;
    call split_count calc(split,pre);
    SPLIT_COUNT = SVOCLKS_PER_WEDGE - CURR_SOS_SVO_CNT
+
    DFCT_ACCUMULATOR =0x4800 -0x447f + 0x30 = 0x3b1
    SPLIT_COUNT_SYMBOL = SPLIT_COUNT * RATIO = 0x93a;
    SPLIT_COUNT_SYMBOL -=SYMBOLS_PER_RESYNC =0x93a -0x30 = 0x90a;
    SPLIT_COUNT SYMBOL SAVE = SPLIT COUNT SYMBOL =0x93a;
    RESUME_COUNT = SVO_CNT_AT_START_OF_DATA =0x80;
    SPLIT_NEEDED =0;};
    return;
    // if the sector has been split across a servo wedge, then determine if there are any defects between
    // the beginning of the data wedge and the end of the current sector
    // was the sector split? (This calculates the defect 98 and the resync field 99 in FIG. 5B)
    if CURR_SOS_WEDGE_NUM != SOS_WEDGE_NUM=5, 6 = TRUE
    while (Defect_Location_Wedge == SOS_WEDGE_NUM = 5 = 5 = TRUE &&
        Defect_Location_Servo_Clocks <= SOS_SVO_CNT =0x110 <0x3c3 =TRUE
        SOS_SVO_CNT += Defect_Length_Servo_Clocks =0x3c3 +0x28 =0x3cb;
    call split_count_calc(dfct,post);
    SPLIT_COUNT = Defect_Location_Servo_Clocks-
        SVO_CNT_AT_START_OF_DATA + DFCT_ACCUMULATOR; =0x210 - 0x80+ 0x30=0x1c0;
        SPLIT_COUNT_SYMBOL = SPLIT_COUNT * RATIO = 0x460;
        SPLIT_COUNT_SYMBOL -= SYMBOLS_PER_RESYNC = 0x460-0x30=0x430;
    if (split && post == TRUE) {SPLIT_COUNT_SYMBOL += = TRUE
    SPLIT_COUNT_SYMBOL_SAVE =0x430 + 0x93a = 0xd6a;
    DFCT_ACCUMULATOR += Defect-Length_Servo_Clocks =0x30 + 0x28 =0x58;
    RESUME_COUNT=SPLIT_COUNT + Defect_Length_Servo_Clocks =0x1c0 +0x28 = 0x1e8;
    DFCT_TBL_PTR ++ ; // increment pointer each time through while loop return;

// end of calculations, done, return to top and wait for go_indication

Using the pseudocode just described or similar pseudocode in algorithms, defects can be isolated for data recording/reproducing purposes, without isolating the entire sector in which a defect is found.

While the principles of the invention have been described above in connection with specific apparatus and applications, it is to be understood that this description is made only by way of example and not as a limitation on the scope of the invention.

What is claimed is:

1. A method for formatting a rotating memory medium for use in a hard disk drive comprising:

defining concentric tracks on the medium, each track having a succession of servo areas for recording tracking information, the servo areas of adjacent tracks being located to form a plurality of spaced radial servo wedges, each track also having spaces between successive servo areas for recording data, at least the starting locations of each servo area and each space for storing data being stored in memory;

scanning the tracks of the medium for defects and storing at least the starting location of each defect in memory; and recording tracking information in the servo areas, wherein reading and writing operations in the spaces for storing data can be controlled at least in part by recognizing the beginning locations of the servo areas; and data is divided into data sectors when recorded in the spaces for storing data, each data sector having no more than a predetermined number of bytes occupying a predetermined length along one of the tracks, whereby data sectors can be split across servo areas if the unused space preceding a selected servo area is smaller than the data sector length, the remaining data in the data sector being recorded in the space following the selected servo area;

the defects being processed in the same manner as servo areas, so that the user data area in which a particular defect is located can be available for reading and writing before the location of the defect, and after a predetermined distance following the defect.

2. The method of claim 1, comprising:

creating track definition tables which can be used to locate the tracks, and creating cylinder servo wedge definition tables which can be used to identify and locate the data sectors and defects.

3. A hard disk drive comprising:

a rotating recording medium, a read head and write head located at an end of an actuator arm, the actuator arm being rotatable so that the read and write heads can traverse the rotating recording medium radially across the medium, a motor for controlling the motion and location of the actuator arm, and a controller having a processor, a first memory for performing read and write operations, a second memory storing track definition tables and cylinder servo wedge definition tables, and a sector generator having algorithms by which the processor can control the location of the read and write heads over the recording medium using the track definition tables, each track having a succession of servo areas defined by the cylinder servo wedge definition tables, the servo areas having tracking information recorded on the medium, the servo areas of adjacent tracks being located to form a plurality of spaced radial servo wedges, the track definition tables further storing the starting locations of each servo area and each space between adjacent servo areas, the spaces being used to record data, the cylinder servo wedge definition tables further including at least the starting location of defective areas in the recording medium, wherein reading and writing operations in the spaces for storing data can be controlled at least in part by recognizing the beginning locations of the servo areas; and data is divided into data sectors when recorded in the spaces for storing data, each data sector having no more than a predetermined number of bytes occupying a predetermined length along one of the tracks, whereby data sectors can be split across servo areas if the unused space preceding a selected servo area is smaller than the data sector length, the remaining data in the data sector being recorded in the space following the selected servo area;

the defects being processed in the same manner as servo areas, so that the user data area in which a particular defect is located can be available for reading and writing before the location of the defect, and after a predetermined distance following the defect.

4. A formatter for formatting a rotating memory medium for use in a hard disk drive, comprising:

a read head and a write head, a servo motor for moving the heads back and forth in a radial direction across the recording medium, and a controller, the controller having a processor, a first memory having algorithms for controlling the position of the heads through the servo motor, and algorithms for controlling reading and writing operations of the read and write head, the MPU having sector generator algorithms and registers for creating and storing in a second memory track definition tables and cylinder servo wedge definition tables, the processor executing the algorithms to perform the steps of:

defining concentric tracks on the medium, each track having a succession of servo areas for recording tracking information, the servo areas of adjacent tracks being located to form a plurality of spaced radial servo wedges, each track also having spaces between successive servo areas for recording data, at least the starting locations of each servo area and each space for storing data being stored in memory;

scanning the tracks of the medium for defects and storing at least the starting location of each defect in memory; and recording tracking information in the servo areas, wherein reading and writing operations in the spaces for storing data can be controlled at least in part by recognizing the beginning locations of the servo areas; and data is divided into data sectors when recorded in the spaces for storing data, each data sector having no more than a predetermined number of bytes occupying a predetermined length along one of the tracks, whereby data sectors can be split across servo areas if the unused space preceding a selected servo area is smaller than the data sector length, the remaining data in the data sector being recorded in the space following the selected servo area;

the defects being processed in the same manner as servo areas, so that the user data area in which a particular defect is located can be available for reading and writing before the location of the defect, and after a predetermined distance following the defect.

* * * * *

UNITED STATES PATENT AND TRADEMARK OFFICE
CERTIFICATE OF CORRECTION

| | |
|---|---|
| PATENT NO. | : 7,589,926 B2 |
| APPLICATION NO. | : 12/023393 |
| DATED | : September 15, 2009 |
| INVENTOR(S) | : Richmond et al. |

Page 1 of 1

It is certified that error appears in the above-identified patent and that said Letters Patent is hereby corrected as shown below:

In the Claims:

Col. 14, line 27, after "head" and before "the MPU" insert a paragraph.

Col. 14, line 43, after "areas" and before "wherein" insert a paragraph.

Signed and Sealed this

Nineteenth Day of January, 2010

David J. Kappos
*Director of the United States Patent and Trademark Office*